United States Patent [19]

Reedy

[11] Patent Number: 4,705,349

[45] Date of Patent: Nov. 10, 1987

[54] OPTICAL SWITCH

[75] Inventor: Robert P. Reedy, Livermore, Calif.

[73] Assignee: The United States of America as represented by the United States Department of Energy, Washington, D.C.

[21] Appl. No.: 692,760

[22] Filed: Jan. 18, 1985

[51] Int. Cl.$^4$ .............................................. G02B 6/26
[52] U.S. Cl. .............................. 350/96.15; 350/96.18; 350/96.20
[58] Field of Search ............... 350/96.15, 96.16, 96.18, 350/96.19, 96.20, 486, 266, 275, 321, 574; 372/15, 16

[56] References Cited

U.S. PATENT DOCUMENTS

| | | | |
|---|---|---|---|
| 3,275,831 | 9/1966 | Martin | 350/275 |
| 4,208,094 | 6/1980 | Tomlinson, II et al. | 350/96.20 |
| 4,211,469 | 7/1980 | Holzman | 350/96.16 |
| 4,239,331 | 12/1980 | Aoyama | 350/96.20 |
| 4,245,884 | 1/1981 | Magura et al. | 350/96.16 |
| 4,261,638 | 4/1981 | Wagner | 350/96.15 |
| 4,304,460 | 12/1981 | Tanaka et al. | 350/96.16 |
| 4,322,126 | 3/1982 | Minowa et al. | 350/96.20 |
| 4,358,858 | 11/1982 | Tamura et al. | 455/607 |
| 4,403,861 | 9/1983 | Boisde et al. | 356/407 |
| 4,408,831 | 10/1983 | Sakaguchi et al. | 350/266 X |
| 4,470,662 | 9/1984 | Munzhiu | 350/96.15 |

FOREIGN PATENT DOCUMENTS

| | | | |
|---|---|---|---|
| 126201 | 9/1980 | Japan | 350/96.20 |
| 147603 | 11/1980 | Japan | 350/96.15 |
| 39501 | 4/1981 | Japan | 350/96.13 |
| 102804 | 8/1981 | Japan | 350/96.18 |

OTHER PUBLICATIONS

Burke et al, IBM Tech. Discl. Bull., vol. 18, No. 2, Jul. 1975, "Fiber Optic Repeater Bypass Switch", pp. 481–482.

Primary Examiner—William L. Sikes
Assistant Examiner—Frank González
Attorney, Agent, or Firm—Gary C. Roth; Clifton E. Clouse, Jr.; Judson R. Hightower

[57] ABSTRACT

An optical switching device (10) is provided whereby light from a first glass fiber (16) or a second glass fiber (14) may be selectively transmitted into a third glass fiber (18). Each glass fiber is provided with a focusing and collimating lens system (26, 28, 30). In one mode of operation, light from the first glass fiber (16) is reflected by a planar mirror (36) into the third glass fiber (18). In another mode of operation, light from the second glass fiber (14) passes directly into the third glass fiber (18). The planar mirror (36) is attached to a rotatable table (32) which is rotated to provide the optical switching.

4 Claims, 3 Drawing Figures

OPTICAL SWITCH

The United States Government has rights in this invention pursuant to Contract No. W-7405-ENG-48 between the U.S. Department of Energy and the University of California for the operation of the Lawrence Livermore National Laboratory.

BACKGROUND OF THE INVENTION

The invention described herein relates generally to optical switching method and apparatus, and more particularly to an optical switching device wherein light from a first or a second glass fiber may be selectively transmitted into a third glass fiber.

It is a common practice in the present optical field to switch light between bare glass fibers by reflecting it from a rotatable concave mirror. Such an optical switch is taught by Wagner in U.S. Pat. No. 4,261,638 issued Apr. 14, 1981.

It is also known in the present optical field to achieve light switching between glass fibers by either passing or not passing the light through a transparent dielectric plate of uniform refractive index. Such switches are taught by Aoyama in U.S. Pat. No. 4,239,331 issued Dec. 16, 1980, and by Minowa et al in U.S. Pat. No. 4,322,126 issued Mar. 30, 1982.

Nevertheless, there remains a need for an optical switch that is economical, dependable and easy to work with, and efficient with respect to light loss.

SUMMARY OF THE INVENTION

It is therefore an object of the invention to provide an optical switching device, wherein light from a first or a second glass fiber may be selectively transmitted into a third glass fiber, that is economical.

Another object of the invention is to provide an optical switching device, wherein light from a first or a second glass fiber may be selectively transmitted into a third glass fiber, that is dependable and easy to work with.

Yet another object of the invention is to provide an optical switching device, wherein light from a first or a second glass fiber may be selectively transmitted into a third glass fiber, that is efficient with respect to light loss.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the method and apparatus of this invention may comprise an optical switch for selectively switching light leaving a first or a second glass fiber into a third glass fiber. A separate lens system is attached to the end of each glass fiber. In the case of the first and second glass fibers, the attached lens systems collimate the light leaving the two fibers into a first and a second parallel beam of light, respectively. In the case of the third glass fiber, the attached lens system focuses parallel light impinging upon the lens system upon the end of the third glass fiber. Preferably each of the three attached lens systems is a laser lens.

The three glass fibers are rigidly attached to a mounting fixture. The first and third glass fibers are positioned so that the parallel beam of light leaving the first glass fiber, when unimpeded, is focused on the end of the third glass fiber. The second glass fiber is positioned so that the beam of light leaving it passes through the beam of light emitted from the first glass fiber.

A rotatable table, to which a planar mirror is rigidly attached, is rotatably mounted upon the mounting fixture. Following rotation, the planar mirror may repeatably take either a first or a second fixed position. In the first position, the mirror impedes the beam of light leaving the first glass fiber and prevents it from being focused onto the end of the third glass fiber while, at the same time, reflecting the beam of light from the second glass fiber so that it is focused onto the end of the third glass fiber. In the second position the mirror neither impedes the beam of light leaving the first glass fiber nor reflects the beam of light leaving the second glass fiber. By selectively rotating the planar mirror into either its first or its second position, light is switched from either the second or the first glass fiber into the third glass fiber, respectively. Preferably a snail spring is employed to impel the rotation of the rotatable table.

The benefits and advantages of the present invention, as embodied and broadly described herein, include, inter alia, the provision of an optical switching device, wherein light from a first or a second glass fiber may be selectively transmitted into a third glass fiber, that is economical, dependable and easy to work with, and efficient with respect to light loss.

BRIEF DESCRIPTION OF THE DRAWINGS

The accompanying drawings, which are incorporated in and form a part of the specification, illustrate an embodiment of the invention and, together with the description, serve to explain the principles of the invention. In the drawings.

DETAILED DESCRIPTION OF THE INVENTION

Figure 1A:
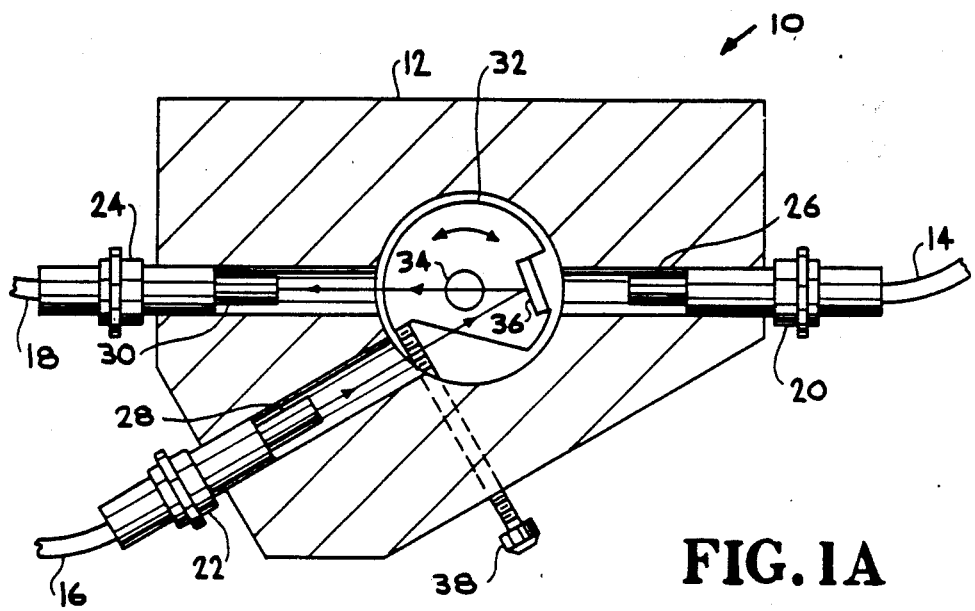
FIG. 1A is a top view of an optical switch made in accordance with the invention, showing a rotatable table that is a part of the switch in a first position.
Figure 1B:
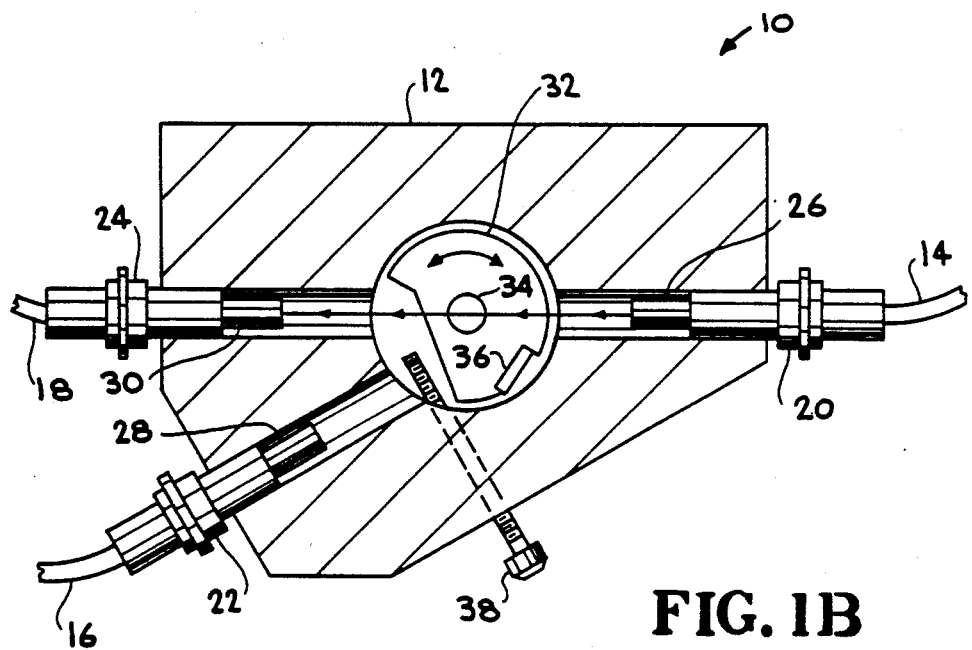
FIG. 1B is a top view of the optical switch of FIG. 1A, showing the rotatable table in a second position.

Reference will now be made in detail to the present preferred embodiment of the invention, an example of which is shown in the accompanying drawings. Reference is first made jointly to FIGS. 1A and 1B which each show a top view of an optical switch, 10, made in accordance with the invention. The switch comprises mounting fixture 12 to which glass fibers 14, 16 and 18 are rigidly attached. The attachment of glass fibers 14, 16 and 18 to mounting fixture 12 is accomplished by means of attachment assemblies 20, 22 and 24, respectively. The particular construction of attachment assemblies 20, 22 and 24 is not critical, and each assembly may comprise several parts as schematically indicated in the figures. Lens systems 26, 28 and 30 are attached by attachment assemblies 20, 22 and 24, respectively to glass fibers 14, 16 and 18, respectively. The lens systems are so positioned by the attachment assemblies that they can each either collimate the light leaving the glass fiber to which it is attached into a parallel beam of light, or focus parallel light impinging upon the lens system upon the end of the glass fiber to which it is attached. Thus a purpose of each attachment assembly is to hold its associated lens system and glass fiber in a mutually fixed and axially parallel relationship.

Preferably, each of lens systems 26, 28 and 30 is a laser lens. A laser lens is a very small multi-element lens as used in optical recording. An example of a laser lens is lens system VP4825-? as supplied by the Olympus Corporation of America, Pearicorder Division, New Hyde Park, N.Y.

FIGS. 1A and 1B also each show rotatable table 32, which is rotatably mounted upon mounting fixture 12 by shaft 34. Planar mirror 36 is rigidly attached to rotatable table 32. Rotatable table 32 is shown in a first position in FIG. 1A and in a second position in FIG. 1B. In the first position, rotatable table 32 touchingly abuts screw stop 38, because the placement of planar mirror 36 in the first position is critical. Planar mirror 36 performs two important functions when rotatable table 32 is in the first position. Planar mirror 36 impedes the parallel beam of light leaving glass fiber 14 via lens system 26 from arriving at lens system 30, thereby preventing it from being focused upon the end of glass fiber 18. At the same time, planar mirror 36 reflects the parallel beam of light leaving glass fiber 16 via lens system 28 so that it is focused by lens system 30 upon the end of glass fiber 18.

The second position of rotatable table 32 is shown in FIG. 1B. In this position, the parallel beam of light leaving glass fiber 14 via lens system 26 is unimpeded and is focused by lens system 30 upon the end of glass fiber 18. The parallel beam of light leaving glass fiber 16 via lens system 28 passes through the parallel beam of light leaving glass fiber 14 via lens system 26, without being reflected by planar mirror 36.

Figure 2:
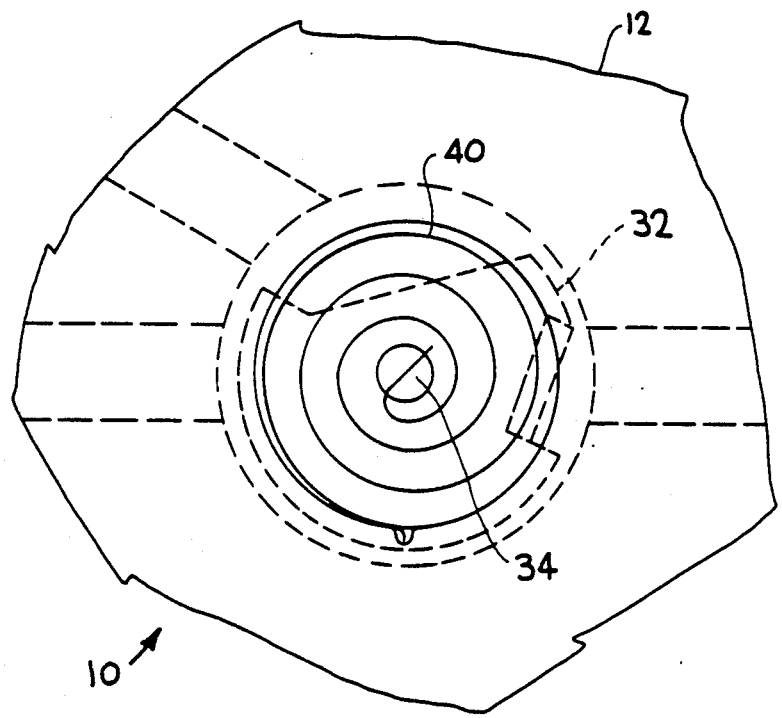
FIG. 2 is a partial bottom view of the optical switch of FIG. 1A, showing the snail spring that impels the rotation of the rotatable table.

By selectively and repeatedly rotating rotatable table 32 and attached planar mirror 36 into the first or second position, the selective switching of light from glass fiber 16 into glass fiber 18, or of light from glass fiber 14 into glass fiber 18, is achieved. The light loss in the glass fiber 14 to glass fiber 18 coupling can be made as small as −0.8 db. As shown in FIG. 2, which is a partial bottom view of optical switch 10, it is preferable if snail spring 40, which is attached to both mounting fixture 12 and shaft 34, impels the rotation of rotatable table 32.

It is thus appreciated that in accordance with the invention as herein described and shown in FIGS. 1A, 1B and 2, an optical switching device is provided, whereby light from a first or a second glass fiber may be selectively transmitted into a third glass fiber, that is economical, dependable, easy to work with, and efficient with respect to light loss.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. An apparatus for selectively optically switching either light leaving a first glass fiber, or light leaving a second glass fiber, into a third glass fiber, the apparatus comprising:

a first lens system, attached onto said first glass fiber, to collimate the light leaving said first glass fiber into a first parallel beam of light;

a second lens system, attached onto said second glass fiber, to collimate the light leaving said second glass fiber into a second parallel beam of light;

a third lens system, attached onto said third glass fiber, to focus parallel light impinging upon said third lens system upon an end of said third glass fiber;

a mounting fixture to which said first, second and third glass fibers are rigidly attached, so that said first parallel beam of light, when unimpeded, is focused by said third lens system upon the end of said third glass fiber, and so that said second parallel beam of light passes through said first parallel beam of light;

a planar mirror; and a rotatable table, rotatably mounted upon said mounting fixture, to which said planar mirror is rigidly attached, whereby said mirror may repeatably take either a first position, where said mirror impedes said first parallel beam of light thereby preventing it from being focused by said third lens system upon the end of said third glass fiber and, at the same time, reflects said second parallel beam of light so that it is focused by said third lens system upon the end of said third glass fiber, or a second position, where said mirror does not impede said first parallel beam of light and does not reflect said second parallel beam of light, so that by selectively rotating said planar mirror into said first position or said second position, the selective optical switching of light from said second glass fiber into said third glass fiber, or of light from said first glass fiber into said third glass fiber, respectively, is achieved.

2. An apparatus as recited in claim 1 in which said first, second and third lens systems each comprise a laser lens.

3. An apparatus as recited in claim 1 further comprising a snail spring, attached to both said mounting fixture and to said rotatable table, to impel the rotation of said rotatable table.

4. A method for selectively optically switching either light leaving a first glass fiber, or light leaving a second glass fiber, into a third glass fiber, the method comprising the steps of:

collimating the light leaving said first glass fiber into a first parallel beam of light, by attaching a first lens system onto said first glass fiber;

collimating the light leaving said second glass fiber into a second parallel beam of light, by securing a second lens system onto said second glass fiber;

focusing parallel light onto an end of said third glass fiber, by fastening a third lens system onto said third glass fiber;

positioning said first and third glass fibers so that said first parallel beam of light, when unimpeded, is focused by said third lens system upon the end of said third glass fiber;

positioning said second glass fiber so that said second parallel beam of light passes through said first parallel beam of light;

rotatably mounting a planar mirror so that the mirror may repeatably take either a first position, where the mirror impedes said first parallel beam of light thereby preventing it from being focused by said third lens system upon the end of said third glass fiber and, at the same time, reflects said second parallel beam of light so that it is focused by said third lens system upon the end of said third glass fiber, or a second position, where the mirror does not impede said first parallel beam of light and does not reflect said second parallel beam of light; and selectively rotating said planar mirror into either said first position or said second position, to thereby selectively optically switch the light leaving said second glass fiber into said third glass fiber, or the light leaving said first glass fiber into said third glass fiber, respectively.

* * * * *